United States Patent [19]

Tremel et al.

[11] Patent Number: 5,724,354
[45] Date of Patent: Mar. 3, 1998

[54] METHOD FOR THE INSERTION OF CELLS INTO AN ATM TYPE FLOW AND IMPLEMENTATION DEVICE

[75] Inventors: Jean Yves Tremel, Pleumeur-Bodou; Bertrand Mathieu, Lannion, both of France

[73] Assignee: France Telecom, Paris, France

[21] Appl. No.: 555,294

[22] Filed: Nov. 8, 1995

[30] Foreign Application Priority Data

Nov. 8, 1994 [FR] France .................................. 94 13403

[51] Int. Cl.$^6$ .................................................. H04L 12/56
[52] U.S. Cl. .......................................... 370/395; 370/409
[58] Field of Search .............................. 370/60.1, 60, 94.1, 370/94.2, 94.3, 84, 330, 332, 335, 389, 384, 392, 393, 394, 395, 396, 397, 399, 409, 410, 412

[56] References Cited

U.S. PATENT DOCUMENTS 5,315,586  5/1994  Charvillat .................................. 370/60
5,392,398  2/1995  Meyer ....................................... 370/60

FOREIGN PATENT DOCUMENTS 3071749  3/1991  Japan .

OTHER PUBLICATIONS

Patent Abstracts of Japan, vol. 15, No. 236, Jun. 1991.
Helmut Bauch, Transmission Systems for the BISDN, IEEE LCS The Magazine of Lightwave Communication Systems, pp. 31–36; Aug. 1991.
Naoshi Sato et al., Performance Monitoring Method Using OAM Cells in B–ISDN, Communications–Rising to the Heights, Jun. 1991.
Recommandation UIT–T I. 610, Nov. 1995, pp. 1–46.
Recommandation UIT–T I. 361, Mar. 1993, pp. 1–12.
Recommandation UIT–T I. 321, 1991, pp. 1–7.

*Primary Examiner*—Dang Ton
*Attorney, Agent, or Firm*—Nilles & Nilles, S.C.

[57] ABSTRACT

A method for the insertion of a flow of applications-specific cells or maintenance cells into a flow of incident cells according to the ATM standard or a similar standard. To this end, a message characterizing each received cell is formed in real time. This message gives, among others, a piece of information on the type of cell, and the user cells are selected so that each of them is stored for the period of time in which a processing operation is performed on the stored cells. This processing operation is done on the basis of the messages formed to generate a specific cell (or a maintenance cell). This cell is sent out whenever a determined number of user cells has been sent out, and a vacant cell is eliminated. Else, a pending user cell is sent out and a vacant cell is generated. Application to transmission on the ATM networks.

11 Claims, 3 Drawing Sheets

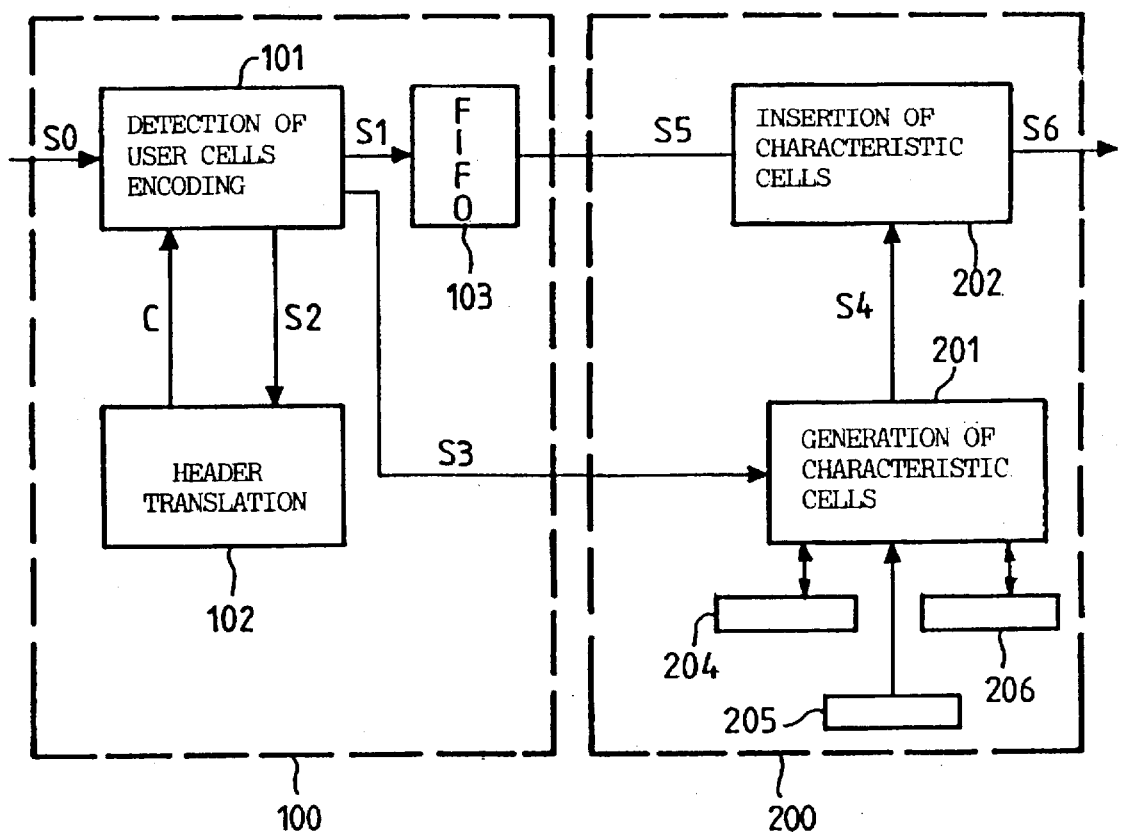
FIG_1
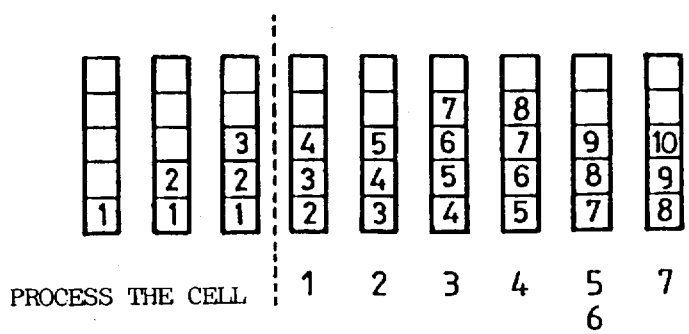
FIG_2

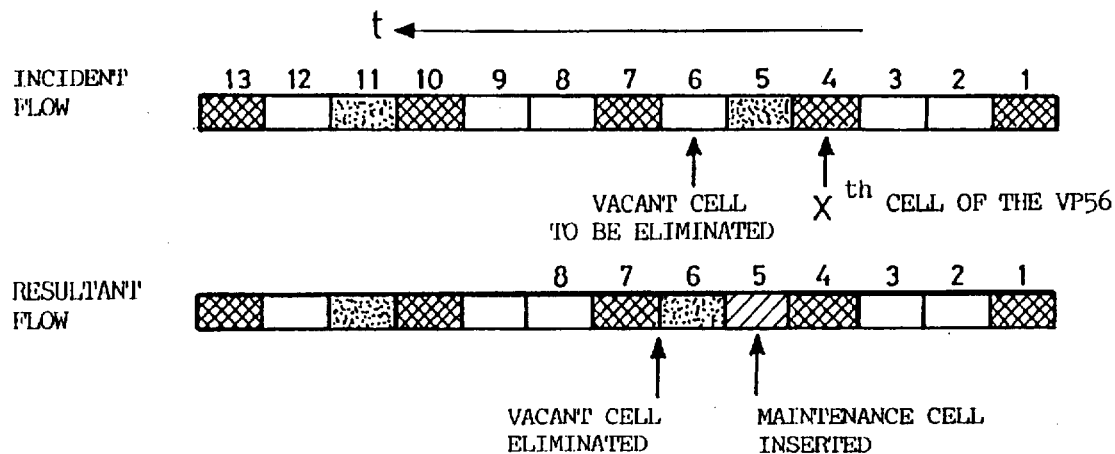
FIG_3
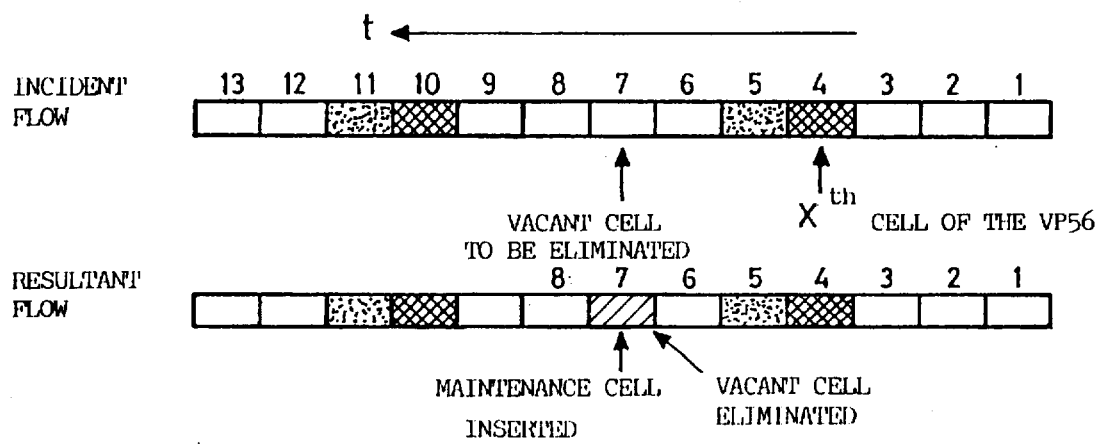
FIG_4

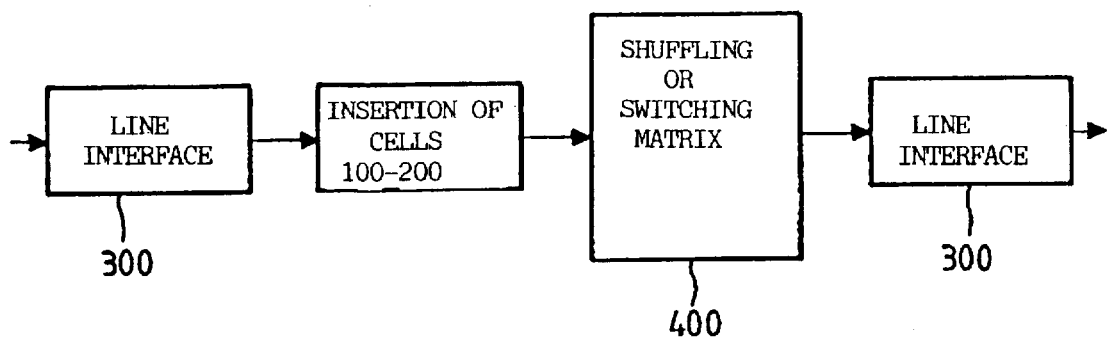
FIG_5
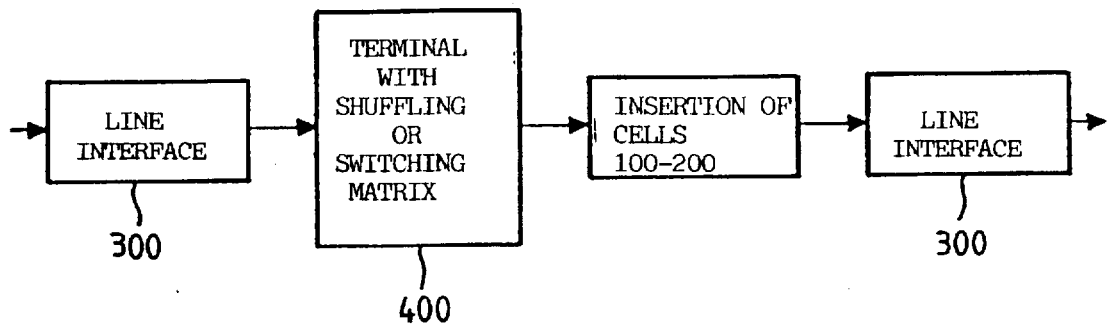
FIG_6
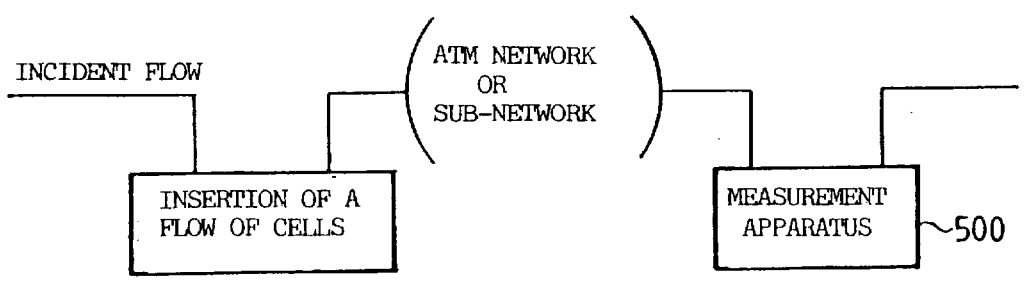
FIG_7

METHOD FOR THE INSERTION OF CELLS INTO AN ATM TYPE FLOW AND IMPLEMENTATION DEVICE

BACKGROUND OF THE INVENTION

1. Field of the Invention

An object of the present invention is a method for the insertion of cells into a flow of ATM (asynchronous transfer mode) type cells with a view, for example, to measuring the quality of a network or the quality of an item of equipment.

2. Description of the Prior Art

It may be recalled that transmission according to the ATM standard is done by the transfer of information blocks of a constant length. The elementary quantity of information elements transmitted is 48 bytes. The block transmitted in ATM is called a cell and is identified by a five-byte label called a header. The total length of a cell is therefore 53 bytes.

The ATM standard enables temporal multiplexing at several levels by organizing the flows of cells in virtual paths (VP) and virtual channels (VC).

Thus, all the ATM cells can be assigned to one of 4096 virtual paths VP and to one of 65536 virtual channels VC. The path numbers and channel numbers of the cell are contained in fields of 12 and 16 header bits respectively. Thus, a five-byte header whose bits are numbered 0 to 7 contains the virtual path number VPI defined on 12 bits, the virtual channel number VCI defined on 16 bits, a payload cell type PT indicator defined by three bits, a cell loss priority CLP indicator defined on one bit as well as an error corrector code HEC defined on eight bits and pertaining to the four preceding bits.

An ATM network enables the transmission of digital information having varied bit rates that could be very high and may go up to 155 Mbit/s.

The ATM standard provides for the inserting of maintenance flows for the ATM layers. These flows are the flows F4 and F5.

The verification of a virtual path is done by the flow F4 by means of OAM cells sent on a reserved virtual channel (VCI=4 for a an end-to-end flow F4, VCI=3 for a sub-network flow F4).

On the contrary, the maintenance flows pertaining to a given virtual channel (flow F5) take the same path as the cells used. They are distinguished by a particular encoding of the PT field.

The insertion of a flow of characteristic cells, whether it is a maintenance flow or another kind of flow, may lead to a reduction of the bit rate offered to users. Indeed, the insertion is done in an enforced way to the detriment of the bit rates offered to users.

SUMMARY OF THE INVENTION

An object of the present invention is a method for the insertion of characteristic cells enabling the insertion to be done in real time while at the same time not reducing the bit rate of the flows offered to users, whatever may be these bit rates.

An object of the invention is also a device for the implementation of the method.

Thus, according to the invention, there is provided a method of insertion wherein, chiefly, whenever there is an insertion of a characteristic cell, a vacant cell of the incident flow is eliminated. The elimination is not done necessarily just after the insertion, the number of vacant cells to be eliminated being counted.

To this end, the method comprises the following steps:

performing a pre-processing operation on the incoming flow so as to firstly form a message characterizing each cell received and giving in particular a piece of information on the type of cell and, secondly, select the user cells and store each of them for the processing time that will follow, performing a processing operation on the basis of the messages formed to generate a characteristic cell, transmitting it whenever a determined number of user cells has been sent and eliminating a vacant cell, else sending a pending user cell or generating a vacant cell.

The processing operations performed in real time according to the method enable the insertion of cells to be done independently of the bit rate of the incoming flow and without disturbing this bit rate.

BRIEF DESCRIPTION OF THE DRAWINGS

The present invention will be understood more clearly from the following description, given by way of a non-restrictive illustration, with reference to the appended drawings of which:

FIG. 1 is a schematic view of the principle of the device according to the invention, FIG. 2 illustrates the movements of the messages in stack 203, FIGS. 3 and 4 illustrate the incoming and outgoing flows according to two embodiments, FIGS. 5, 6 and 7 are diagrams pertaining to various possible layouts.

MORE DETAILED DESCRIPTION

According to the invention, the device has a circuit 100 for the pre-processing of the incident flow of cells S0.

This circuit enables the real-time formation of a characteristic message ME for each incoming cell. This message has in particular an indication on the state of the cell or more precisely on the type of cell so that it can be known whether it is a vacant cell or a user cell or another predetermined type of cell. Hereinafter, all the user cells and non-user cells will be called non-vacant cells. "Non-user cells" are cells whose VCI is lower than 15 and the characteristic cells.

The pre-processing circuit furthermore enables the selection, from the incoming flow, of the non-vacant cells so that they can be stored as and when they arrive.

The device furthermore has a processing circuit 200 which, on the basis of the stored messages, can be used to find out the time at which it is necessary to generate a characteristic cell in the outgoing flow. Thus, according to the invention, the circuit enables the generation of the characteristic cell and the elimination of a vacant cell from the incoming flow whenever a determined number X of user cells has been sent out.

When this number X is not reached, the circuit enables the successive sending of the cells of the incoming flow, whether these are user cells or vacant cells. Should it be necessary to send out a vacant cell, this circuit generates this cell since, as shall be seen here below, the incoming vacant cells are not stored.

The pre-processing circuit has a circuit 101 for the detection of user cells and for the formation of messages for each cell. This cell furthermore has a translation memory 102 and a FIFO type buffer circuit. The circuit 101 firstly enables the detection of the user cells on the basis of the headers of cells in order to store them in a buffer memory or stack 103 and, secondly, the addressing of the translation memory 102.

The cells of the incoming flow are used by the circuit 101 to address the translation memory 102 which delivers a pre-recorded code for each of them. The circuit 101 uses this code and the information elements of the cell to form a message comprising a first word M1 for the encoding of the virtual path number VPI and a second word M2 to indicate the type of cell. A third word M3 contains parity bits BIP16 computed on the data elements contained in the cells. The word M2 indicating the type of cell can be used to find out if the cell received is a vacant cell or a user cell or a non-user cell, namely for example a maintenance cell or a user cell with a VC indicator <15.

The information elements S3 flowing between the circuit 101 and the processing circuit 200 correspond to the messages formed by the circuit 101 for each cell received. The processing circuit 200 comprises a circuit 201 for the generation of the characteristic cells receiving the information elements S3 from the circuit 101. This processing circuit 200 furthermore has a cell-insertion circuit 202 capable of carrying out the insertion, into the flow of user cells S5, of a characteristic cell obtained by the reading of the buffer memory 103 when it receives the command to do so from the generation circuit 201.

For example, we may take the case of the insertion of quality supervision maintenance cells.

We may also take the case where the insertion is done after an Xth cell of a virtual path VPI. The cell processed by the circuit 201 is the cell pertaining to the message at the bottom of the stack 103.

If the value of the message at the bottom of the stack 203 corresponds to a cell belonging to one of the 4096 virtual paths on which it is not desired to carry out an insertion of flow or to a non-user cell, then the circuit sends a control signal on S4 to the circuit 202 to order the reading of the buffer memory 103, the sending of this cell on S6 and a state of standby for a cell whose message, formed by the circuit 101, will be placed at the top of this stack 203.

If the value of the message placed at the bottom of the stack corresponds to a user cell of a VP into which it is sought to insert a characteristic flow, then the circuit increments a counter 204 of user cells received on this virtual path by one and performs the necessary processing operations pertaining to the user cells and to the maintenance cell. This processing consists, firstly, for each cell of each path, in computing the contents of the field BIP16 by performing an exclusive-OR operation between the BIP16 of the previous cells and the BIP16 of the current cell and, secondly, in determining the contents of the TUC (total user cells) field. These contents are determined by the value of the cell counter.

In the same way as in the previous case, the circuit 201 sends the circuit 202 a read control signal to order the reading of the memory 103, the sending of the user cell on S6 and a state of standby for a cell.

If the value of the message placed at the bottom of the stack corresponds to the Xth user cell, the circuit 201 sends the command, on S4, for the reading of the corresponding cell in the stack 103 and for the sending of this cell on S6. The processing done is the same as the one that has just been described here above for a user cell (for example, with a state of standby for the next message S3).

Furthermore, the circuit 201 sends a command for the generation of a maintenance cell to the circuit 202. It computes the BIP16 of this cell and sends it to the circuit 202 along with its VPI. It also sends the MSN (maintenance sequence number) contents of a counter 205 and the total number of user cells TUC given by the counter 204. The MSN contents represent the number of the maintenance cell sent. The counter 205 is incremented by one at each maintenance cell sent.

The circuit 202 then sends the user cell and then the maintenance cell FR [VP IO 00 40 20 MSN TUC BIP16 FF FF FF 6A 6A . . . 6A CRCIO], since it has been chosen, in this example, to send the maintenance cell for quality supervision just after the Xth user cell.

Furthermore, the circuit 201 increments a counter 206 of maintenance cells sent. It is this counter that will make it possible to find out how many vacant cells have to be eliminated.

If the value of the message placed at the bottom of the stack 103 corresponds to a vacant cell, this circuit 201 sends a command on S4 to generate a vacant cell if the counter 206 should be zero and waits for the message S3. Should this counter be not zero, then the vacant cell is not sent, the counter 206 is decremented by one and the next cell is immediately processed.

The device that has just been described enables the implementation of the method according to the invention. According to this method, characteristic cells are inserted into an incident flow of cells.

As has been stated, the term "characteristic cells" is understood to mean maintenance cells such as those defined by the ATM standard for the flow F4 or F5 or specific cells (containing specific data elements).

The insertion of the maintenance flows may be done on one or more ATM paths and even on all the paths according to the method. Furthermore, the insertion is done independently of the user bit rate.

According to the method, a characteristic cell is inserted at intervals of every X user cells of one and the same virtual path. The number X may be fixed once and for all, or it may be fixed variably, according to the application chosen.

This insertion is done in accordance with the method by preserving the bit rate of the user flow. To this end, when X cells of one and the same path have been sent, a characteristic cell will be inserted and a vacant cell will be eliminated. The arrival of a vacant cell will therefore be awaited in order to eliminate it after having inserted a characteristic cell.

Naturally, if no vacant cell arrives and if the number X of cells is exceeded, the characteristic cell is inserted and the number of vacant cells to be eliminated is counted. The characteristic cell may be sent at any time in the interval between the cell X and the cell (X+1).

A detailed description shall now be given of the operation of the device. The flow S0 corresponds to the flow of ATM cells. The received cells are detected by their header, the cells having a wrong header being eliminated. The wrong headers are detected in a known way by means of the contents of the header field HEC. The detection of the non-vacant cells is done in a standard way by comparison with the fixed contents of a vacant cell header.

The flow S1 corresponds to the non-vacant cells detected. These cells are placed on standby as and when they arrive in the buffer memory or stack 103. The duration of the wait corresponds in practice to the duration of processing of the previous cell by the circuit 201. The circuit 101 detects the user cells and at the same time enables the formation of the message ME for each cell of the flow. The first word M1 corresponds in a preferred way to the 12-bit encoding of the virtual path indicator VPI and the virtual channel indicator to which the cell belongs. The second word M2 is the indicator of the type (or state) of the cell.

As described, this word M2 enables an indication of whether the received cell is a vacant cell or a user cell or a non-user cell (typically a maintenance cell). The third word M3 contains 16 parity bits BIP16 computed on the data elements contained in the cell. The message thus formed is transmitted to the processing circuit 201 to be memorized in a buffer memory 203.

In a preferred exemplary embodiment, should the received cell be a vacant cell or a user cell, the translation memory 102 is used. As has been described, this memory makes it possible to obtain a word M1 whose size is smaller than the size of the information to be processed since, without this encoding, there would be 32 bits (VPI+VCI) per cell.

Should the cell to be inserted be a maintenance cell as defined for the flow F4 in the ATM standard, the word M1 is formed directly without any passage through the translation memory. This is the virtual path indicator VPI of the cell.

According to the method of the invention, these messages are memorized in a buffer memory for the period of time taken to process cells placed previously in the buffer memory. This memory is of the FIFO type. The messages are read successively to be processed by the circuit 201.

At resetting, it is expected that the buffer memory or stack 103 will have a predetermined number M of messages. This introduces a delay of M cells in the real flow. However, this delay is small enough not to be a constraint.

The messages thus memorized are read one after the other as soon as the number M is reached. When a message ME of a user cell is read, the message of the cell X+1 is memorized. The memory in this case always contains M messages.

Through the reading of a message ME pertaining to a cell X, the contents of the word M2 giving the state of the cell are known and it is thus possible to carry out the appropriate processing operation.

So long as no characteristic cell has to be inserted, i.e. so long as at least X cells of the same virtual path have not been set out at the exit from the circuit 202, the messages of the buffer memory 203 continue to be read and the cells read continue to be sent out in the buffer circuit 103.

When the message read represents the Xth user cell, the circuit 202 is made to read the FIFO type buffer circuit 103, and then a characteristic cell is generated by circuit 201, and a message S3 is awaited. At the first of the following messages representing a vacant cell, this cell is not sent and the next message is read without waiting for the arrival of a message corresponding to a new cell.

Thus, the insertion of the characteristic cell is compensated for by the elimination of a vacant cell. The bit rate of the VP considered is therefore maintained.

For a clearer understanding of the invention, reference shall now be made to the drawing of FIG. 2.

This figure shows the movements of the messages formed by the cells in the stack or buffer 103.

Let it be assumed that this stack is reset with M=3 messages. This means that there is no processing during the arrival of these first three messages. The processing starts with the message of the cell 1. Let it be assumed that it is a vacant cell.

Then, the circuit 201 sends the circuit 202 an indication specifying that it must reconstitute the vacant cell and send it. This circuit 201 awaits the message from the next cell (cell 4).

This circuit 202 then processes the message of the cell 2 which, for example, is a user cell and awaits the message from the next cell (cell 4).

Let it be assumed that the cell to be processed (the cell 3) is the Xth one. This cell must then be sent out and then a characteristic cell must be sent out. During this time therefore, two cells arrive: these are the cells 6 and 7, the messages of which are placed at the top of the stack. The cell therefore now contains M+1=4 messages and the counter of inserted cells is equal to 0+1=1. The circuit then processes the message of the cell 4 which is a user cell and awaits the message of the cell 8.

The message of the cell 5 indicates that it is a vacant cell and the counter of inserted cells is not zero. This cell then has to be eliminated. It is not sent out and the circuit processes the message of the next cell 6 without waiting for the arrival of the message of the next cell. The stack then contains M+1−1=M messages and the counter of inserted cells is equal to 1−1=0.

Then, the circuit waits for the message from the next cell 9. Two cells are therefore processed during one "cell period".

The message of the cell 7 indicates that it is a vacant cell and the counter is at zero. Then, this cell is sent out and the circuit awaits the next message, namely the message of the cell 10 and so on and so forth.

In this example, it has been chosen to send a characteristic cell just after the Xth cell of the flow. Clearly, this insertion may be postponed by saving the elements needed to form the characteristic cell and by counting these cells to insert them at the required time in doing so while eliminating a vacant cell in accordance with the invention.

Reference could be made, for the following part of the description, to the drawings of FIGS. 3 and 4.

FIG. 3 provides a schematic illustration, on the first line, of an incident flow in which the cells are numbered 1 to 13 and in which the different types of cells are shown distinctly according to the legend indicated. The second line shows the resulting flow after the insertion of a maintenance cell and the elimination of a vacant cell at the location indicated, namely after the Xth cell of the same virtual path VP56 (for example).

FIG. 4 illustrates a second variant of an embodiment. According to this variant, a maintenance cell is introduced into the flow represented on the first line so that it is in the middle of two cells of the same path VP56, the first being the Xth cell of this VP56.

The midpoint between two cells of one and the same path is defined by the distance between them in time, namely the bit rate. This distance can be easily measured because what has to be done is to measure the bit rate and divide it by two to find out the location of the cell to be inserted.

The drawings of FIGS. 5, 6 and 7 illustrate three possible layouts of the device that has just been described.

FIGS. 5 and 6 correspond to the cases where the insertion of the cells is done in an ATM apparatus.

Indeed, it is possible to lay out this device in a shuffler or in a switch 400 by placing this device upline with respect to the shuffler or to the switch as shown in FIG. 5.

The interface 300 shows the matching between the ATM level and the physical level.

Furthermore, this device may also be laid out in a network terminal and, in this case, it will be placed at the exit from the terminal as shown in FIG. 6.

FIG. 7 corresponds to the case where the insertion is done outside an ATM apparatus.

In this case, the device is placed on the line of the network. It receives the flow conveyed by this line and sends the flow on the line of the network after insertion of the (maintenance) cells. In this case, there is provided a measurement apparatus 500 at reception to perform quality measurements on the network.

For example, the device has been made as follows:

for the circuits 101 and 202: XILINX programmable logic circuits have been used.

for the circuit 201: a DSP type fast processor has been used, enabling the performance of the processing operations in real time (cell time). With DSP type fast processors, it is possible to insert a flow F4 or F5 as well as a specific flow at any bit rate whatsoever.

What is claimed is:

1. A method for inserting a characteristic cell into a flow of incident cells transmitted along a virtual path according to an ATM standard, the incident cells comprising user cells and vacant cells, wherein said method comprises the following steps:

(A) performing a real-time pre-processing operation on an incoming flow of incident cells so as to 1) form a message that characterizes each said incident cell and that provides a piece of information concerning a type of each said incident cell, and 2) select the user cells and store each said user cell; and (B) performing a real-time processing operation including generating a characteristic cell on the basis of the messages formed during the step (A), if a designated number of user cells has been sent along the path, then inserting the characteristic cell into the flow of incident cells and eliminating one of the vacant cells from the flow of incident cells, and if the designated number of user cells has not been sent along the path, sending a pending user cell further along the path, and generating a vacant cell.

2. A method for inserting a characteristic cell according to claim 1, wherein the insertion of the characteristic cell is performed just after the appearance of an Xth user cell of the flow, and wherein the vacant cell that is eliminated is either 1) a first vacant cell that appears in the flow after the insertion of the characteristic cell or 2) a vacant cell that appears in the flow during the insertion of the characteristic cell.

3. A method for inserting a characteristic cell according to claim 1, wherein the insertion of the characteristic cell is performed in a time interval between an arrival of an Xth user cell and an arrival of an (X+1)th user cell, and wherein, when there is no vacant cell to be eliminated, the number of vacant cells to be eliminated is counted.

4. A method for inserting a characteristic cell according to claim 1, wherein the characteristic cell is a cell for the maintenance of quality supervision.

5. A method for the insertion of a flow of cells according to claim 1, wherein the characteristic cell is a cell of a specific flow defined for a particular application.

6. A device for inserting a characteristic cell into a flow of incident cells transmitted along a virtual path according to an ATM standard, the incident cells comprising user cells and vacant cells, said device comprising:

real-time pre-processing means for 1) forming a message for each incoming cell, for detecting the user cells, and for storing the user cells, real-time processing means for 1) counting the user cells, 2) generating the characteristic cell, 3) inserting the characteristic cell into the flow of incident cells after a number X of user cells has been counted, and 4) eliminating a vacant cell from the flow of incident cells upon the insertion of the characteristic cell.

7. A device according to claim 6, wherein the pre-processing means further comprises a translation memory and a buffer memory.

8. A device according to claim 6, wherein the pre-processing means further comprises a buffer memory.

9. A method for inserting a characteristic cell into a flow of incident cells transmitted along a virtual path according to an ATM standard, the incident cells comprising user cells and vacant cells, wherein said method comprises the following steps:

(A) performing a real-time pre-processing operation on an incoming flow of incident cells that includes
(1) identifying a user cell, and then
(2) storing the user cell in a memory along with a number of previously-identified and stored user cells; and (B) performing a real-time processing operation that includes
(1) generating a characteristic cell,
(2) withdrawing the user cell from the memory, then
(3) determining whether or not less than a number X of user cells has been withdrawn from the memory,
(4) if it is determined that the designated number X of user cells has been withdrawn from the memory, then inserting the characteristic cell into the flow of incident cells and eliminating a vacant cell from the flow of incident cells, and
(5) if the designated number X of user cells has not been withdrawn from the memory, then sending a pending user cell further along the path and generating the vacant cell.

10. A method according to claim 9, wherein the insertion of the characteristic cell is performed just after the appearance of an Xth user cell of the flow, and wherein the vacant cell that is eliminated is either 1) a first vacant cell that appears in the flow after the insertion of the characteristic cell or 2) a vacant cell that appears in the flow during the insertion of the characteristic cell.

11. A method according to claim 9, wherein the insertion of the characteristic cell is performed in a time interval between an arrival of an Xth user cell and an arrival of an (X+1)th user cell, and wherein, when there is no vacant cell to be eliminated, the number of vacant cells to be eliminated is counted.

* * * * *